(12) United States Patent
Sonobe

(10) Patent No.: US 7,180,408 B2
(45) Date of Patent: Feb. 20, 2007

(54) METER FOR DISPLAYING VIRTUAL IMAGE

(75) Inventor: Tsunehisa Sonobe, Shimada (JP)

(73) Assignee: Yazaki Corporation, Tokyo (JP)

( * ) Notice: Subject to any disclaimer, the term of this patent is extended or adjusted under 35 U.S.C. 154(b) by 101 days.

(21) Appl. No.: 10/909,358

(22) Filed: Aug. 3, 2004

(65) Prior Publication Data
US 2005/0040940 A1    Feb. 24, 2005

(30) Foreign Application Priority Data
Aug. 4, 2003    (JP)    ............................. 2003-286238

(51) Int. Cl.
*B60Q 1/00*    (2006.01)
(52) U.S. Cl. ...................... 340/438; 340/459; 340/461; 340/462; 340/525; 345/7; 345/35; 345/633
(58) Field of Classification Search ................ 340/438, 340/459, 461, 462, 525; 345/7, 35, 633
See application file for complete search history.

(56) References Cited

U.S. PATENT DOCUMENTS 5,376,917 A * 12/1994 Yoshimoto et al. ......... 340/438

FOREIGN PATENT DOCUMENTS

| DE | 10225385 A1 | | 6/2002 |
|---|---|---|---|
| GB | 2266375 A | | 10/1993 |
| JP | 09257523 | * | 3/1997 |
| JP | 09-288457 | * | 4/1997 |
| JP | 9257523 A | | 10/1997 |
| JP | 2001-105928 A | | 4/2001 |
| JP | 2002156926 A | | 5/2002 |

* cited by examiner

*Primary Examiner*—Tai Nguyen
(74) *Attorney, Agent, or Firm*—Sughrue Mion, PLLC

(57) ABSTRACT

A virtual image type meter includes a virtual image display (3) for projecting a first image reflected by a half mirror (10) toward an range of sight (ER), and a real image display (11) positioned at the back side of the half mirror (10) for projecting a second image to be seen through the half mirror (10) toward the range of sight (ER). According to above configuration, the virtual image type meter can display a larger number of useful information. Further, a total display width, which is a sum of the first and the second image widths, can be narrower than that of the meter in which the real image display (11) is positioned in front of the half mirror (10).

3 Claims, 5 Drawing Sheets

METER FOR DISPLAYING VIRTUAL IMAGE

The priority application Number Japanese Patent Application No. 2003-286238 upon which this patent application is based is hereby incorporated by reference.

FIELD OF THE INVENTION

This invention relates to a virtual image type meter for making information displayed by a virtual image display visible from a vehicle driver, and in particular, a virtual image type meter using both the virtual image display and a real image display. Said information displayed by the virtual image display is reflected by a mirror attached to an inner surface of a housing of the virtual image display for allowing the vehicle driver to see from a driver's seat.

DESCRIPTION OF THE RELATED ART

Recently, so-called a virtual image type meter displaying virtual image has been employed in a passenger vehicle and the like for improving visibility of information displayed on the meter for a vehicle driver. In the virtual image type meter, normally, information given by the virtual image display is reflected by a predetermined mirror to project toward an range of sight of the vehicle driver. In this virtual image type meter, as a path from the virtual image display to the range of sight is prolonged, a difference between said path and a path from the range of sight to a forward view through a windshield is reduced. Thereby, the visibility of the information for a driver is improved. Such a virtual image type meter is disclosed in, for example, a Japanese Non-examined Patent Publication No. 2001-105928.

Further, recently, a meter combining the virtual image display and a real image display has been proposed. In such a virtual image type meter having the real image display, information about a vehicle is formed by combining the first image projected from the virtual image display and the second image projected from the real image display without a mirror reflection. This information about a vehicle is visually recognized by an range of sight of a driver.

However, in reality, a range of sight of even the same driver may be shifted vertically and horizontally, in particular horizontally within a predetermined range. A distance between the range of sight and the second image is relatively short and a distance between the range of sight and the first image is relative long. Therefore, the difference between the distances may cause an overlap of the first and second images. The overlap may be visually recognized from a predetermined range of sight. For example, it is possible that no overlap of the first and second images is seen when viewed from a front of the meter, while an overlap is seen when viewed from a right front of the meter.

For avoiding the overlap, the first image display should be positioned outside of the range of sight for seeing the virtual image. However, simply positioning the real image display in this way causes an increase of a total display width, which is a sum of widths of the virtual and real image displays. Consequently, an occupying space of the meter is increased.

Further, regarding the real image display, each inner surface of a light source receiving chamber is formed with a same tilt angle. Therefore, uneven illumination on a display surface of the real image display is often recognized through a normal range of sight of a vehicle driver looking down the virtual image type meter. Thus, there still remain problems to be solved in the virtual image type meter including the real image display that is formed by simply combining both displays.

This invention has been accomplished to solve the above-described problems and an object of this invention is to provide a meter for vehicle having excellent space efficiency and visibility, and displaying a larger number of useful information.

SUMMARY OF THE INVENTION

In order to attain the object, this invention provides a virtual image type meter including: a virtual image display for displaying a first image indicating one predetermined vehicle information by luminous indication; a half mirror for reflecting the first image from the virtual image display toward a predetermined range of sight of a vehicle driver; and a real image display for displaying a second image indicating another predetermined vehicle information by luminous indication, said real image display being positioned at the back side of the half mirror to allow the second image to be seen through the half mirror, whereby the first and second images are visually recognized by the vehicle driver from the range of sight extended to include an expected variation without any overlap between those images.

According to above, the virtual image type meter of this invention includes the virtual image display projecting the first image reflected by the half mirror toward the range of sight, and the real image display being positioned at the back side of the half mirror, and projecting the second image to be seen through the half mirror toward the range of sight. Since the real image display is so positioned that no overlap of the first and second images is visually recognized, the virtual image type meter can display a larger number of useful and visible information. In, addition, since the real image display is positioned at the back side of the half mirror, the total display width, which is a sum of the virtual and real image widths, can be narrower than that of the meter in which the real image display is positioned in front of the half mirror as shown in FIG. 5A. Therefore, space efficiency of this virtual image type meter is improved.

Preferably, in the virtual image type meter described above, the real image display is spaced a predetermined distance from the half mirror to allow the second image to be visually recognized at both sides of the first image from the range of sight.

According to above, as shown in FIG. 5b, the total display width of the virtual image type meter can be reduced.

Preferably, in the virtual image type meter described above, the real image display displays a warning, which is only displayed when it is required, and the virtual image display displays a measured value of a measuring instrument of the vehicle, which is always displayed.

Therefore, since the real image display displays the second image, which is displayed when it is required, this meter displays a larger number of useful information than a conventional virtual image type meter.

Preferably, in the virtual image type meter described above, the real image display includes a light source receiving chamber having inner walls sloped from a bottom to an opening of the chamber, and a specifically designed sheet for covering the opening of the chamber, said designed sheet on which a design of the second image is formed. For illuminating the designed sheet more evenly than an inner wall having a same slope angle, said inner walls have different slope angles corresponding to positions of the inner walls. Therefore, the visibility of the second image is improved.

DESCRIPTION OF THE PREFERRED EMBODIMENT

One embodiment of a virtual image type meter according to this invention will now be described with reference to the attached drawings. At first, an overall structure of the virtual image type meter is explained with reference to FIGS. 1 to 3.

Figure 1:
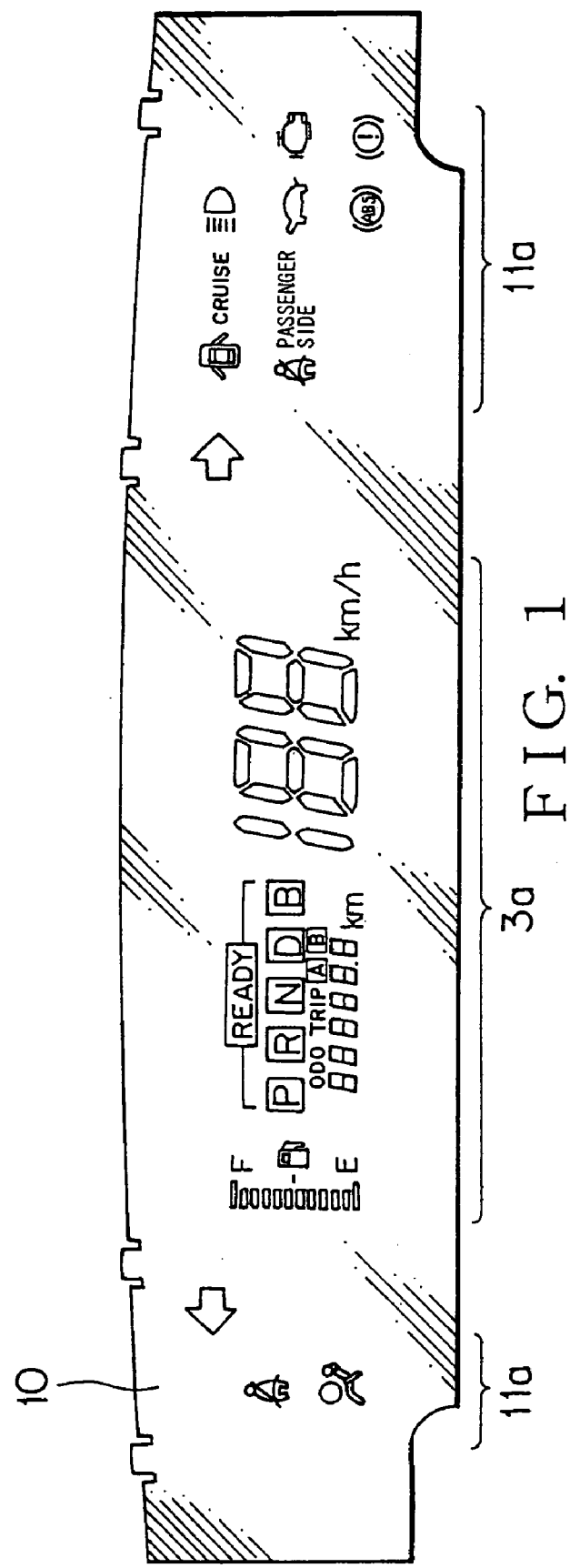
FIG. 1 is a schematic view showing one embodiment of an information display of a virtual image type meter according to this invention.

As shown in FIG. 1, in this virtual image type meter, information about a vehicle formed by combining first and second images 3a, 11a through a half mirror 10 is visually recognized through a range of sight of a driver seated on a driver seat of the vehicle. Here, various warnings and turn signals are displayed as the second images 11a, and various measured values of a speedometer, an odometer, a fuel gage, a gear selector indicator, and the like are displayed as the first images 3a. These assignments of this invention are not limited to this embodiment.

The real image display 11 is positioned at the back side of the half mirror 10 and the virtual image display 3 is positioned in a lower front of the half mirror 10. The second image 11a is transmitted form the real image display 11 through the half mirror 10 toward the range of sight. On the other hand, the first image 3a is transmitted from the virtual image display 3, reflected by a total reflection mirror 5 and then reflected by the half mirror 10 toward the range of sight.

Figure 2:
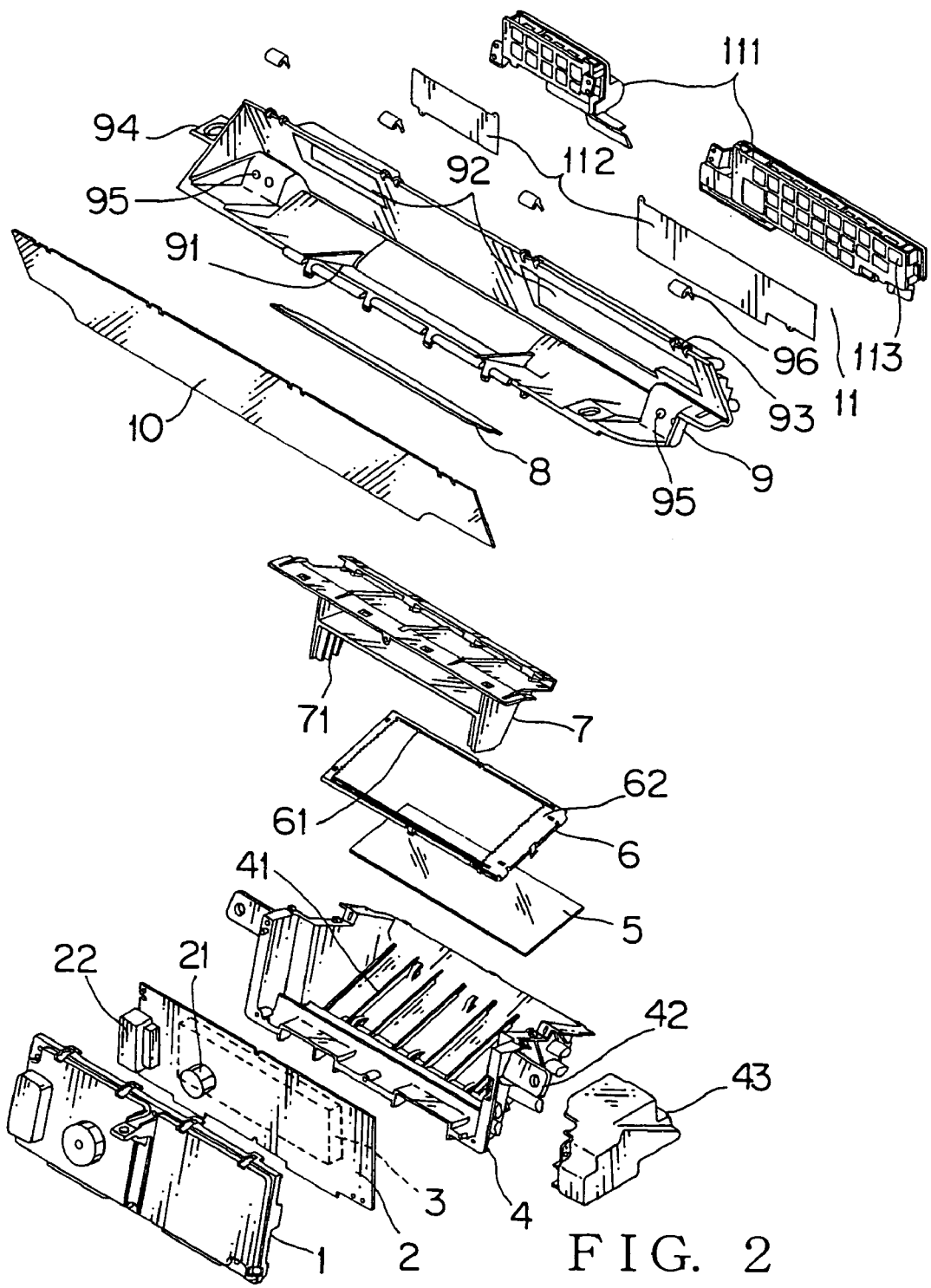
FIG. 2 is an exploded perspective view showing one embodiment of the virtual image type meter according to this invention.
Figure 3:
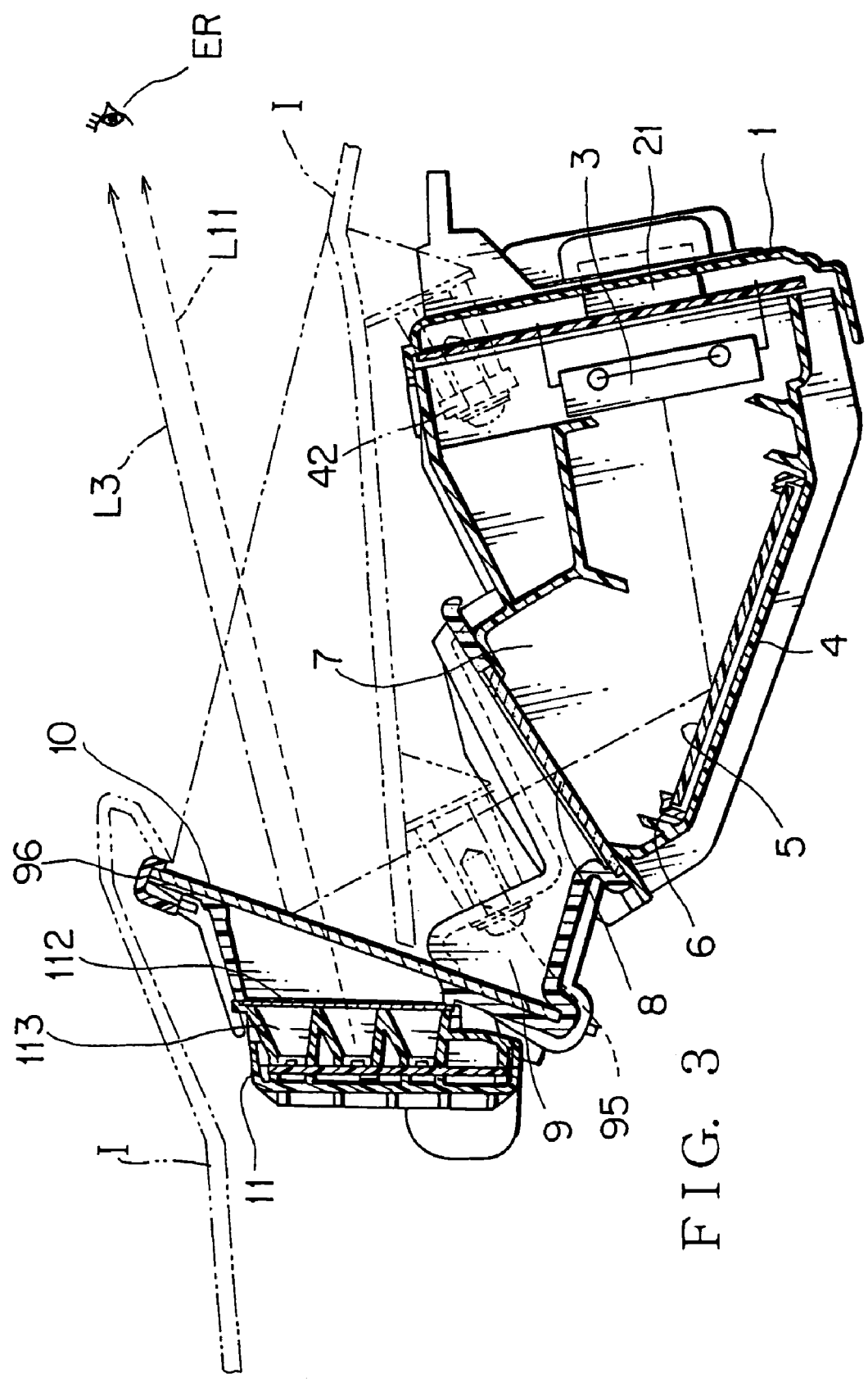
FIG. 3 is a section view of the virtual image type meter in FIG. 2.

As shown in FIGS. 2 and 3, this virtual image type meter includes a back unit 1, a substrate 2, the virtual image display 3, a reflection unit 4, the total reflection mirror 5, a mirror holder 6, a holder unit 7, a cover window 8, a front unit 9, the half mirror 10 and the real image display 11.

In this virtual image type meter, an outer shape is made by combining the back unit 1, the reflection unit 4, the holder unit 7, and the front unit 9, and embedded under an instrument panel I at a front part of a vehicle. Each unit is, for example, made of black synthetic resin, and fixed to each other with screws.

The back unit 1 is in a shallow rectangular pan shape, and receives the substrate 2. The reflection unit 4 has a slope 41 on which a mirror holder 6 is attached. Further, a plurality of mounting pieces 42 for mounting the reflection unit 4 on the instrument panel I are provided on a side surface of the reflection unit 4. A side unit 43 for receiving related electronic parts is provided on one of the side surfaces of the reflection unit 4. The holder unit 7 is provided on the mirror holder 6, which is, attached on the slope 41. A plurality of ribs 71 for suppressing the reflection of the light emitted from the virtual image display 3 are provided on an inner side surface of the holder unit 7. The reflection unit 4 and the holder unit 7 are main parts of this virtual image type meter.

The front unit 9 has a triangle pole shape having an opening facing the driver's range of sight. An opening 91 corresponding to a shape of the cover window 8 is formed at a lower surface of the front unit 9. Two openings 92 corresponding to shapes of display surfaces of the two real image displays 11 respectively are formed on an upper surface of the front unit 9. Further, a plurality of engaging parts 93 for fixing the half mirror 10 on the openings 92 are formed on a top edge of the front unit 9. An attaching piece 94 with a hole for hanging a clamp is formed on a side surface of the front unit 9. A mounting hole 95 for mounting to an instrument panel is formed on an inner surface of the front unit 9.

Various electronic parts 21 for this virtual image type meter, a power connector 22, and the like are assembled on a back surface of the substrate 2. Further, the virtual image display 3 is assembled on a front surface of the substrate 2. One example of the virtual image display 3 is a light emitting display such as a vacuum fluorescent display. This virtual image display 3 is assembled on the substrate 2 and positioned on the deepest bottom surface of a housing of the virtual image type meter. Display elements corresponding to the first image 3a shown in FIG. 1 are formed on a display surface of the virtual image display 3, and emits light in response to a predetermined control signal.

The total reflection mirror 5 is a well-known flat reflecting member with more than 90 percent of reflectivity in a rectangular shape. The total reflection mirror 5 is held in a mirror holder 6 that is made of frames. The mirror holder 6 is made of black type synthetic resin and made of frames 61, 62 that are wide enough to cover the image projected from the virtual image display 3.

The cover window 8 is made of a dark semi-permeable plate, for example, a well-known flat acrylic plate with 90 percent transmittance. The cover window 8 works for adjusting subtly color of the reflected image, and for protecting the virtual image display 3 and the total reflection mirror 5 from dust after being attached on the opening 91 of the front unit 9 to lid the housing receiving the virtual image display 3 and the total reflection mirror 5.

The half mirror 10 essentially does not reflect all of incident light and transmits a predetermined percentage of the incident light. Therefore, the image projected from the real image display 11 passes through the half mirror 10 toward an range of sight ER. On the other hand, the image projected from the virtual image display 3 and reflected by the total reflection mirror 5 is reflected again by the half mirror 10 toward the range of sight ER.

One example of the virtual image display 11 is a light emitting display such as a liquid crystal display with a backlight. The real image display 11 is made of a main body 111 and a specifically designed sheet 112. The main body is made of a light source receiving chamber 113, a not-shown circuit board attached to the light source receiving chamber 113, and a cover for protecting the circuit board. At least a light source is assembled on the circuit board. Display design corresponding to the second image 11a is formed on the designed sheet 112 and illuminated from its back to be displayed.

In addition, as shown in FIG. 3, the light source receiving chamber 113 has a square tube shape with inner walls sloped from its bottom to its opening. Particularly, a slope angle of an upper inner wall is lower than that of a lower inner wall.

This configure reduces uneven illumination on the designed sheet 112 which is normally looked down through an range of sight of a vehicle driver. Thus, light source receiving chambers 113 with inner walls having different slope angles corresponding to positions of the inner walls can illuminate more evenly the design of the designed sheet 112 than those with inner walls having only one slope angle. Therefore, the visibility of the second image is improved.

Further, from a driver's view, the real image display 11 is positioned at the back side of the half mirror 10, namely, at a front side of a vehicle, and spaced a predetermined distance apart from the half mirror 10. The distance is about 1 centimeter so that waning design of the designed sheet 112 is sufficiently visible from the range of sight of the driver. This configuration improves space efficiency of the virtual image type meter according to later described reason.

Figure 4:
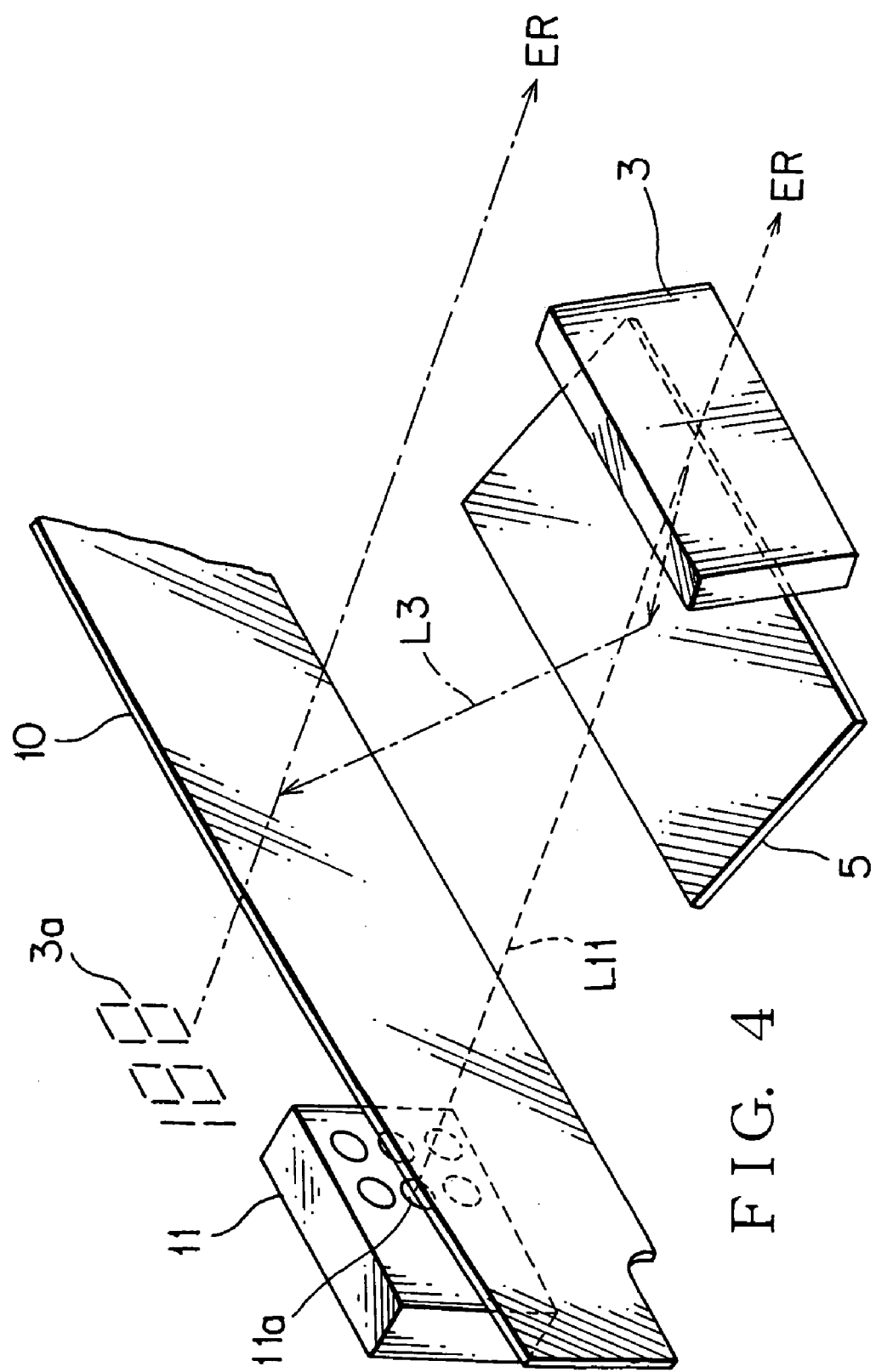
FIG. 4 is an explanatory view showing a principle of a method for displaying information on the virtual image type meter according to this invention.
Figure 5B:
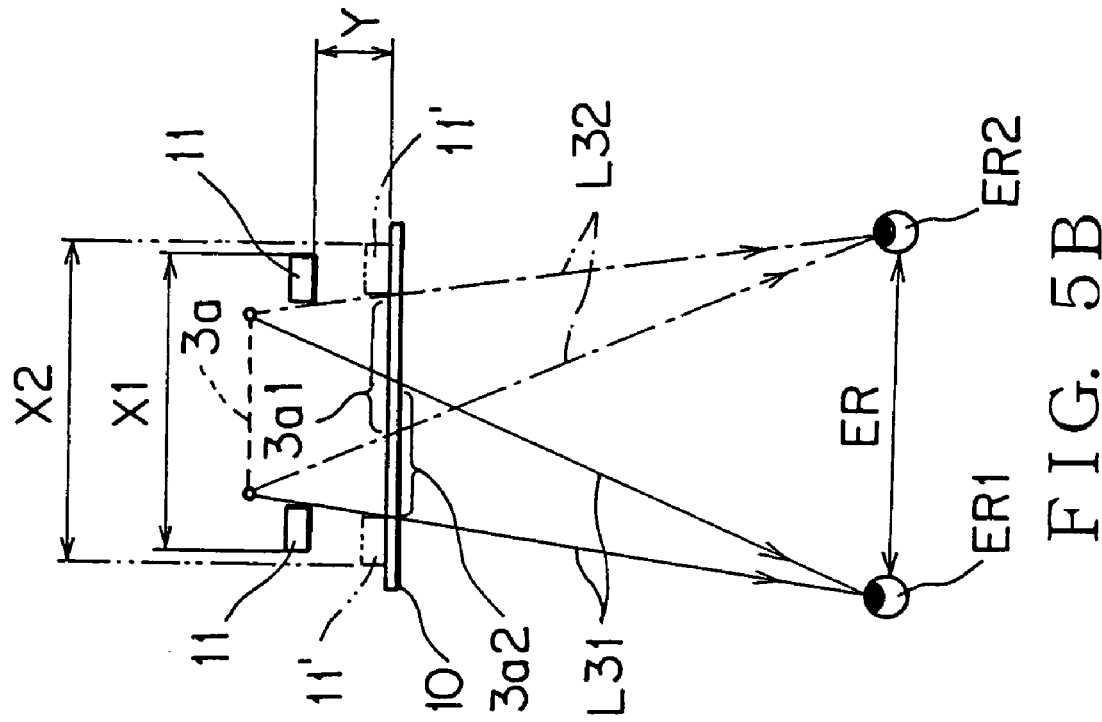
FIG. 5B is a schematic view showing one embodiment of an arrangement of the real image display in order to reduce a total display width of the virtual image type meter.
Figure 5A:
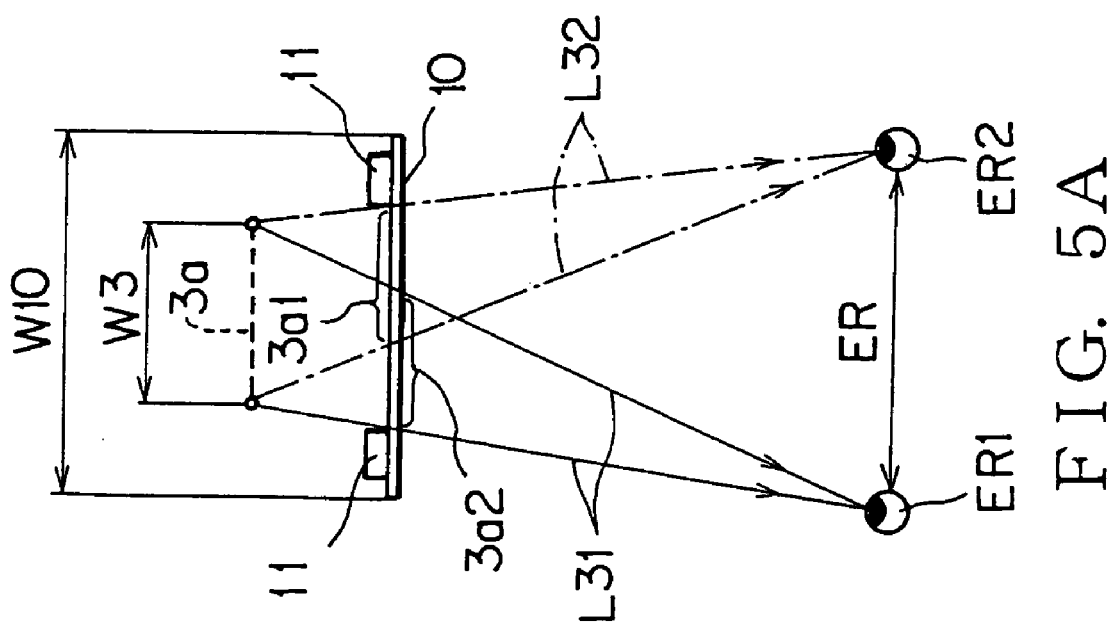
FIG. 5A is a schematic view showing one embodiment of an arrangement of a real image display in order not to overlap the second image of the real image display with the first image of a virtual image display.

Functions and effects of the virtual image type meter in this configuration will be explained with FIGS. 3 to 5. FIG. 4 is an explanatory view showing a principle of a method for displaying information on the virtual image type meter according to this invention. FIGS. 5A and 5B show arrangements of the real image display 11 from a top view. In order to avoid repetitions, identical elements will be designated by identical reference numerals in figures.

As shown in FIGS. 3 and 4, when indicating light L11 for indicating information of such as warning is emitted from the real image display 11 in response to a predetermined control signal, the indicating light 11 passes through the half mirror 10 toward the range of sight ER. On the other hand, when indicating light L3 for indicating information of such as speedometer is emitted from the virtual image display 3 in response to another predetermined control signal, the indicating light L3 is reflected by the total reflection mirror 5, and then passes through the cover window 8 toward the half mirror 10. The indicating light L3 is reflected again by the half mirror 10 toward the range of sight ER. Thus, the driver visually recognizes the information of such as speedometer from the range of sight as if the information was displayed a distance between the virtual image display 3 and the half mirror 10 further.

Therefore, a meter displaying a larger number of useful and visible information can be attained. Particularly, the warning, which is only displayed when it is required, is displayed as the second image 11*a* and a measured value, which is always displayed, is displayed as the first image 3*a*. Therefore, the always-displayed information of the virtual image type meter has a merit of the visibility in a virtual image display, and the virtual image type meter can display more information owing to the second image 11*a* which is displayed when it is required.

In addition, as shown from a top view in FIGS. 5A and 5B, the range of sight may shift in a range between a left end ER1 and a right end ER2. Here, the ER1 and ER2 are previously measured by seating a typical driver.

As L31 and L32 shown from a top view in FIG. 5A, the light being reflected by the half mirror 10 and reaching the range of sights of ER1 and ER2 is not blocked by the both real image displays 11, and recognized by a driver. This is because the real image displays 11 are so positioned that the second image 11*a* and the first image 3*a* may not be visually recognized as overlapping with each other from any shifted range of sights ER.

As 3*a*2 shown in FIG. 5A, the first image 3*a* is visually recognized as shifting relatively left from the left end range of sight ER1 in comparison with the center range of sight, but not as overlapping with the real image 11*a* of the left side real image display 11. Further, the first image 3*a* is visually recognized as shifting relatively right from the right end range of sight ER2 in comparison with the center range of sight, but not as overlapping with the real image 11*a* of the right side real image display 11. Therefore, the visibility of the first and second images 3*a*, 11*a* from a driver's view is improved. Naturally, a display width W3 of the first image 3*a* is narrower than a width W10 of the half mirror 10, and the real image display 11 is designed to be narrower than the width W10.

Further, as shown in FIG. 5A, by positioning the real image display 11 at the back side of the half mirror 10, the total display width of the first 3*a* and second 11*a* image widths can be narrower than that of the meter in which the real image display 11 is positioned in front of the half mirror 10. Therefore, space efficiency of the virtual image type meter is improved.

Preferably, the real image display 11 is spaced a predetermined length Y apart from the half mirror 10. The reference numeral 11' indicates a condition that the real image display 11 is in contact with the half mirror 10. Naturally, the real image displays 11 are again so positioned that the second image 11*a* and the first image 3*a* may not be visually recognized as overlapping with each other from any shifted range of sights ER. Accordingly, as reference numeral 11' shown in FIG. 5B, a total display width X1 as a sum of the first 3*a* and second 11*a* image widths is narrower than X2. Thus, the space efficiency is further improved.

In addition, this invention is not limited to embodiments described above, and various changes and modifications can be made without departing from the spirit and scope of this invention. For example, a plurality of the real image displays 11 are disposed in this embodiment, but it is acceptable that only one real image display 11 is included in the virtual image type meter. Further, the range of sight may be designed for a center meter, which recently has been widely used, or designed for either one or both of right and left-hand drive cars. Further, this invention is applicable for a simple virtual image type meter having no total reflection mirror, and for a virtual image type meter having more than two total reflection mirrors.

What is claimed is:

1. A virtual image type meter including:
    a virtual image display for displaying a first image indicating one predetermined vehicle information by luminous indication;
    a half mirror for reflecting the first image from the virtual image display toward a predetermined range of sight of a vehicle driver; and
    a real image display for displaying a second image indicating another predetermined vehicle information by luminous indication, said real image display being positioned at the back side of the half mirror to allow the second image to be seen through the half mirror,
    whereby the first and second images are visually recognized by the vehicle driver from the range of sight extended to include an expected variation without any overlap between those images,
    wherein the real image display includes a light source receiving chamber having inner walls sloped from a bottom to an opening of the chamber, and a specifically designed sheet for covering the opening of the chamber, said specifically designed sheet on which a design of the second image is formed,
    wherein said inner walls have different slope angles corresponding to positions of the inner walls for illuminating the specifically designed sheet more evenly than inner walls having a same slope angle.

2. The virtual image type meter as claimed in claim 1, wherein the real image display is spaced a predetermined distance from the half mirror to allow the second image to be visually recognized at both sides of the first image from the range of sight.

3. The virtual image type meter as claimed in claim 2, wherein the real image display displays a warning only when it is required, and the virtual image display always displays a measured value of a measuring instrument of the vehicle.

* * * * *